Nov. 25, 1969   G. M. LA POINTE   3,480,055
SAW HOLDER
Original Filed Feb. 13, 1967
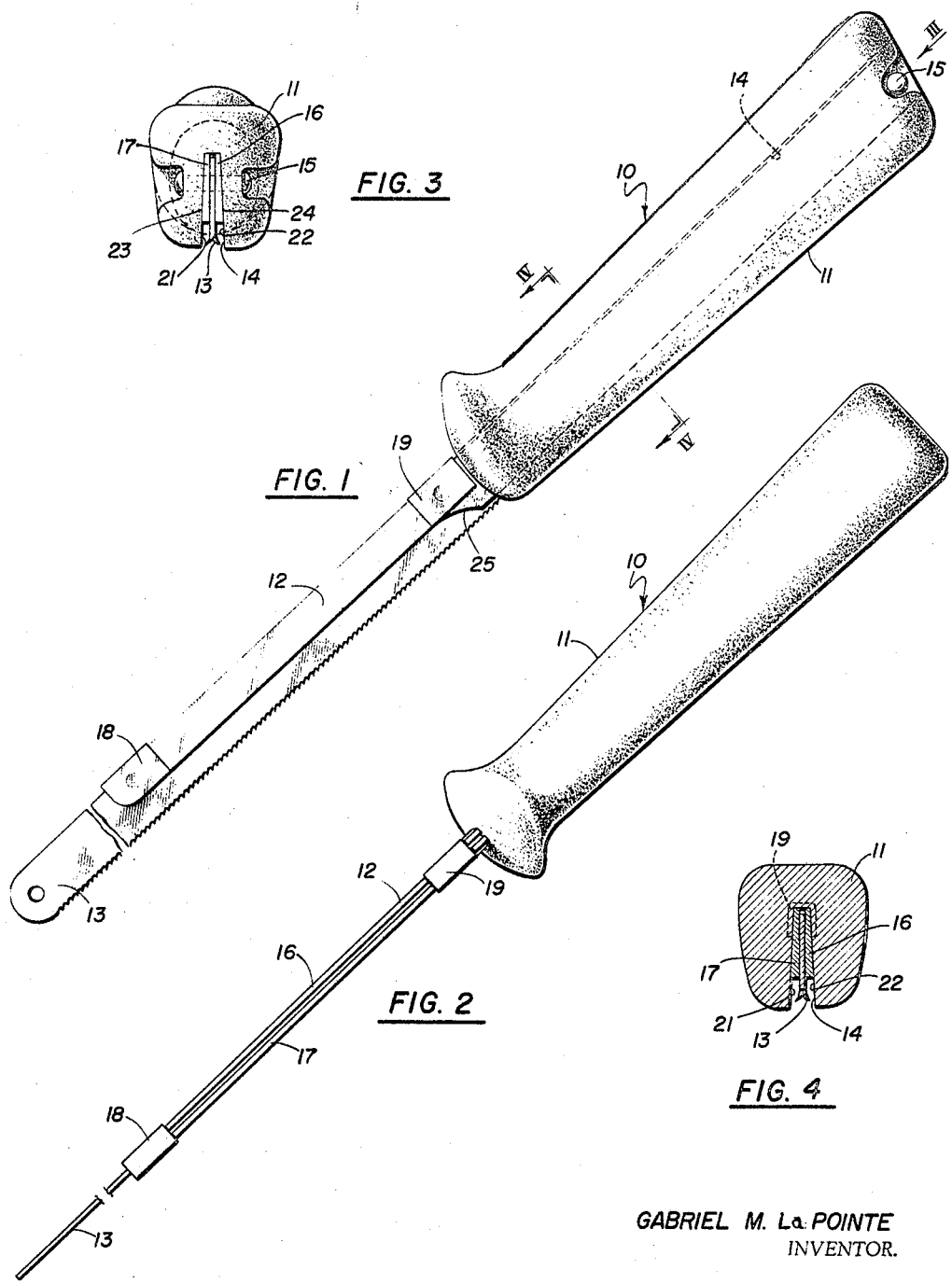
GABRIEL M. La POINTE
INVENTOR.
BY

United States Patent Office 3,480,055
Patented Nov. 25, 1969

3,480,055
SAW HOLDER
Gabriel M. LaPointe, Worcester, Mass., assignor to Parker Manufacturing Company, Worcester, Mass., a corporation of Massachusetts
Continuation of application Ser. No. 615,543, Feb. 13, 1967. This application Sept. 9, 1968, Ser. No. 759,813
Int. Cl. B25q 1/00; B27b 21/00
U.S. Cl. 145—108        5 Claims

ABSTRACT OF THE DISCLOSURE

A saw holder and, more particularly, an apparatus arranged to hold a hacksaw blade so that a substantial portion of the blade is unsupported, the holder consisting of a handle having a wedge-shaped groove in which are swingably movable two plates having inclined cooperative surfaces between which the saw blade is held.

---

This is a continuation of application Ser. No. 615,543, filed Feb. 13, 1967 and now abandoned.

Many devices have been provided in the past to hold a hack saw blade or the like in cantilever position so that it is possible to saw a sheet of wood or other material after a hole has been made. Such a saw is generally known as a "jaw saw" and has been a common article of commerce for many years. However, most of these saws suffer from a number of deficiencies; in many cases, they have been complicated and expensive and easily get out of adjustment. Because of the delicate nature of some of the equipment, it is easily broken and, furthermore, it is difficult to use a substantial portion of the saw blade which is enclosed in the holder. Also, the removal and exchange of the blade has been a complicated mater and the mechanism for accomplishing this quite often becomes useless because of exposure to rain and foreign matter. These and other difficulties experienced with the prior art devices have been obviated in a novel manner by the present invention.

It is, therefore, an outstanding object of the invention to provide a saw holder in which the removal and replacement of the blade is accomplished very easily.

Another object of this invention is the provision of a saw holder in which the apparatus for holding the blade firmly in place is not easily rendered inoperative by water and foreign matter.

A further object of the present invention is the provision of a saw holder which is inexpensive to manufacture, which is simple and rugged in its design, and which is capable of a long life of useful service with a minimum of maintenance.

It is another object of the instant invention to provide a saw holder for holding an elongated blade in which a considerable portion of the blade is available for use.

It is a further object of the invention to provide a saw holder in which the blade is held in a cantilevered manner and the element which supports the blade in this manner is relatively thin and can be inserted into a hole for cutting to increase the amount of blade available at certain parts of the cutting cycle.

A still further object of this invention is the provision of a saw holder having very few parts, whereby it is not rendered useless by the loss of a loose part.

With these and other objects in view, as will be apparent to those skilled in the art, the invention resides in the combination of parts set forth in the specification and covered by the claims appended hereto.

The character of the invention, however, may be best understood by reference to one of its structural forms, as illustrated by the accompanying drawings in which:

FIG. 1 is a side view of a saw holder embodying the principles of the present invention, FIG. 2 is a plan view of the saw holder, FIG. 3 is an end view of the invention taken on the line III—III of FIG. 1, and FIG. 4 is a sectional view of the invention taken on the line IV—IV of FIG. 1.

Referring to FIGS. 1 and 2, wherein are best shown the general features of the invention, the saw holder, indicated generally by the reference numeral 10, is shown as consisting of a handle 11 carrying a blade support 12 in which, for the purpose of illustration, is held a hack saw blade 13. The handle 11 is elongated and is provided with a groove 14 extending along the lower edge within which groove the support 12 lies. The support is hingedly attached at one end to the handle by means of a hinge pin 15, while a substantial portion extends beyond the handle at the other end. The blade 13 extends further beyond the support 12.

The support 12 is shown as comprising two flat strips 16 and 17. These strips are held in spaced parallel relationship, as is evident in FIG. 2, by two U-shaped clips 18 and 19 which are welded to the strips and which embrace the upper edges; that is to say, they embrace the edge from which the blade 13 does not protrude.

As is particularly evident in FIGS. 3 and 4, the groove 14 is wedge-shaped; its side surfaces 21 and 22 slope inwardly and toward one another. The blade 13 is clamped between the facing surfaces of the strips 16 and 17, but the surfaces which face away from one another, namely, the side surfaces 23 and 24, are not parallel to the surfaces which engage the blade 13. On the contrary, they slope in the same manner that the sides 21 and 22 of the groove 14 do. Thus, the sandwich-like combination of the blade 13 between the strips 16 and 17 is exactly the same size and shape as the groove 14 and is conjugate therewith. It is interesting to note that, in the preferred embodiment, the strips 16 and 17 of the support 12 are relatively wide in the portion which lies within the groove 14 in the handle, but are relatively narrow in the portion which extends from the handle, there being a curved junction edge 25 joining the wide portion of each strip to the narrow portion of each strip.

The operation of the invention will now be readily understood in view of the above description. First of all, when the apparatus is in use, it is in the condition shown in FIGS. 1 and 2 with the support 12 firmly retained in the groove 14 and the blade 13 extending well beyond the outer portion of the support 12. In practice, the user grasps the handle 11 in one hand and uses the entire device (with the blade 13 protruding from the forward end thereof) in the manner of a dagger or sword, the sawing action taking place by a jabbing motion.

When it is desirable to change the blade 13, the support 12 is swung out of the groove about the hinge pin 15 to a first position in which the support does not clamp the blade 13 with any degree of force. The blade is easily removed from between the two strips 16 and 17 and a new blade is inserted therein with the teeth of the blade facing downwardly. The other side of the blade is pressed upwardly against the web of the clips 18 and 19. The support and blade are then swung about the hinge pin 15 so that the saw blade 13 and the strips 16 and 17 are forced into the wedge-shaped groove 14. As they are forced up into the groove, the conjugate side surfaces 23 and 24 of the support slide along sloped surfaces 21 and 22 of the groove and are forced by the wedging action into strong clamping engagement with the blade 13. In the preferred embodiment, the slope of the sides of the groove and of the conjugate sides of the strips 16 and 17 is about 4°, thus bringing about tremendous clamping forces between the strips when the support is rotated about the hinge pin 15 into the second position within the groove.

It can be seen that the saw holder is so simple that even rusting due to presence of water in the air or clogging by foreign matter will not inhibit the operation; as a matter of fact, the engaging surfaces can be easily cleaned. There are no loose parts to be lost, the construction is relatively simple and rugged, and it can be inexpensively manufactured. The use of the strips 16 and 17 to form the support 12 results in the function that it occupies very little space; in certain parts of the cutting cycle, the support 12 can be inserted in the hole along with the blade. At certain other parts of the cycle, of course, only the exposed portion of the blade 13 would be used for cutting. It is interesting to note also that the force of cutting and pressing down on the handle 11 to cause the blade 13 to bite will cause the support 12 and the blade to move even further into the wedge-shaped groove 14 to cause even tighter clamping of the blade 13. This prevents injury to the user by release of the blade from the holder in a heavy cutting operation.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A saw holder, comprising
   (a) an elongated handle having a longitudinal groove running along one side,
   (b) an elongated blade support pivotally connected to said handle at one end thereof and comprising two flat strips lying in the groove, the support being movable from a first position exterior of the groove where a saw blade may be removed and replaced to a second position within the groove where the blade is held firmly between said strips, wherein the groove in the handle has at least one side which slopes inwardly and toward the other and wherein the support has a sloping side surface adapted to engage the sloped surface of the groove, so that movement of the support from the first position to the second position causes the support to clamp the blade.

2. A saw holder as recited in claim 1, wherein the support is pivotally connected to the handle at a point adjacent said one end by a hinge pin and wherein the movement from the first position to the second position taking place by swinging movement about the hinge pin.

3. A saw holder as recited in claim 2, wherein U-shaped clips embrace the strips to hold them in spaced, parallel relationship.

4. A saw holder as recited in claim 1, wherein the blade support has a portion extending out of the handle at the other end thereof.

5. A saw holder as recited in claim 4, wherein the two flat strips are held in spaced, parallel relationship and the strips in the portion lying outside of the handle are relatively narrow.

References Cited
UNITED STATES PATENTS

| | | | |
|---|---|---|---|
| 943,645 | 12/1909 | Beaman | 30—332 |
| 955,298 | 4/1910 | Ward | 30—330 |
| 1,774,680 | 9/1930 | Thomas | 30—336 |
| 1,817,023 | 8/1931 | Sniegocki | 30—330 |
| 2,086,234 | 7/1937 | Neidhart | 30—330 |

ROBERT C. RIORDON, Primary Examiner

R. V. PARKER, Jr., Assistant Examiner

U.S. Cl. X.R.

30—331